United States Patent Office.

FRANKLIN S. CLARK, OF CHARLESTON, SOUTH CAROLINA.

PINE-OIL PRODUCT.

SPECIFICATION forming part of Letters Patent No. 390,451, dated October 2, 1888.

Application filed November 10, 1887. Serial No. 254.756. (Specimens.)

*To all whom it may concern:*

Be it known that I, FRANKLIN S. CLARK, of Charleston, South Carolina, have invented a new and useful Pine-Oil Product, of which the following is a full, true, and exact description.

The process herein described results in a purification of the pine-oil and the production of a new product from the same. The oil upon which the process is to be applied is the pine-oil resulting from the distillation of yellow or long-leaf pine-wood, (*Pinus palustris.*) This oil has a specific gravity of .970 to 1.030, is of a deep red to black color, and of a sirupy consistency when cold. This oil should be well separated from the aqueous distillate resulting from the distillation of the pine wood, and then subjected to fractional distillation in an iron still over a free fire, which still may be of any of the known forms and should be provided with a fractional separating apparatus. The object of this distillation is to separate this pine-oil into two distinct portions, the first of which is fluid and thin flowing, while the second is very viscous. In order to accomplish this result, the fire is started at about 220° Fahrenheit. The first distillate passes over. This consists of water, wood, alcohol, acetic acid, and a yellow oil. The heating is continued until water ceases to come over in the distillate. From this portion the yellow oil may be separated by gravity. The heating is continued until about forty per cent. of the original pine-oil is passed over, which will happen at a temperature of about 540°. This part is then removed for treatment by a process described in another application. The distillation is continued, and as the temperature increases the distillate also increases in viscosity and specific gravity. Toward the end of the distillation the oil will tend to solidify into a paraffine resin. Yellow vapors will pass off and the distillate will take on a reddish, and finally a crimson, color. This second portion, which I propose to deal with in the present application, will amount to about fifty per cent. of the original oil. The temperature at which the operation closes is generally between 800° and 850° Fahrenheit. This body as it is received from the still is yellow, but quickly turns to yellow red, and then to crimson, and finally black. It has a blue-green fluorescence and becomes very resinous by exposure. In order to purify this body, I proceed as follows: It is first treated with agitation under heat with ten per cent. of 1.080 specific gravity caustic-soda solution and allowed to settle. The caustic soda is separated, and the oil is preferably washed with water, and then agitated with ten per cent. sulphuric acid of 1.825 specific gravity under heat, and then allowed to settle. The acid is separated, and after washing with weak soda solution the oil is run into a still and subjected to distillation. There will at first pass over some water and mechanically-inclosed light oil, both of which are to be separated and rejected. The higher boiling and heavier oil will begin to distill at about 500° Fahrenheit, and will have a specific gravity of about .910, having a yellow-green color, which by oxidation changes to red and a characteristic odor. As the operation proceeds with an elevation of the temperature viscosity and specific gravity both increase and the color becomes more yellow. The latter portions have a resinous odor and strong green bloom and tend to solidify in the cold. The specific gravity finally reaches 1.040. The oil thus obtained is pumped in bulk into an agitator, treated with five per cent. 1.2 specific gravity caustic-soda solution, and then with four per cent. 1.835 specific gravity sulphuric acid, after which it is redistilled and yields a much better and more permanent product than before. After standing a time, however, this will darken, and therefore the last-named operation is repeated with about three and a half per cent. of 1.2 specific gravity caustic-soda solution and three per cent. of 1.843 specific gravity sulphuric acid, and, if necessary, the same process may be repeated until the product is of a clear straw color, not liable to change, and possessing but a slight odor, which latter may be removed by blowing steam through the oil. The very last portions of each distillation are very resinous, and are preferably set aside, and the first portions of the heavy-oil distillate, ranging from .91 to .96 specific gravity, oxidize quickly, and are also set aside.

The product thus obtained is, first, light in color and yellowish in small test-tubes; second, insoluble in strong ammonia-hydrate; third, it turns brown with concentrated hydrochloric acid; fourth, it blackens with oil of vitriol; fifth, it turns dark brown in contact with concentrated nitric acid and a violent reaction ensues; sixth, it is miscible in acetone; seventh, it does not combine with hydrate of lime and throw out water; eighth, it is partly soluble in ninety-five per cent. alcohol, and with four volumes of hot alcohol dissolves to a clear yellow liquid, from which part of the oil separates in the cold; ninth, it is readily soluble in carbon disulphide; tenth, it is somewhat soluble in glacial acetic acid.

This product is readily distinguished from turpentine by the following characteristics, as well as the first and seventh, already named: The lubricating-oil hereinbefore described is heavier than water. Turpentine is lighter than water. This oil does not distill over below 500° Fahrenheit. Turpentine distills entirely between 314° and 360° Fahrenheit. This oil is not volatile at ordinary temperatures, and does not flash when heated under 350° Fahrenheit. Turpentine is entirely volatile at ordinary temperatures and flashes at 104° Fahrenheit. This oil becomes solid at a temperature between zero and 32° Fahrenheit. Turpentine is liquid at temperatures much below zero.

What I claim as my invention, and desire to secure by Letters Patent, is—

The new product herein specified, having the following characteristics: an oily body light in color and yellowish in small test-tubes, insoluble in strong ammonia-hydrate, turning brown with concentrated hydrochloric acid, turning black with oil of vitriol, turning dark brown in contact with concentrated nitric acid, with a violent reaction, miscible in acetone, not combining with hydrate of lime and throwing out water, soluble in ninety-five per cent. alcohol, dissolving with four volumes of hot alcohol to a clear yellow liquid, from which the oil separates when cold, readily soluble in carbon disulphide, somewhat soluble in glacial acetic acid, having specific gravity heavier than water, not distilling over below 500° Fahrenheit, not flashing when heated under 350° Fahrenheit, and becoming solid between zero and 32° Fahrenheit, substantially as described.

In testimony whereof I have signed my name to this specification in the presence of two subscribing witnesses.

FRANKLIN S. CLARK.

Witnesses:
H. COUTANT,
ANTHONY GREF.